United States Patent [19]

Hörster et al.

[11] Patent Number: 4,562,955
[45] Date of Patent: Jan. 7, 1986

[54] AIR-CONDITIONER

[75] Inventors: Horst Hörster, Roetgen; Klaus Klinkenberg, Aachen, both of Fed. Rep. of Germany

[73] Assignee: U.S. Philips Corporation, New York, N.Y.

[21] Appl. No.: 604,088

[22] Filed: Apr. 26, 1984

[30] Foreign Application Priority Data

Apr. 28, 1983 [DE] Fed. Rep. of Germany ....... 3315444

[51] Int. Cl.$^4$ ............................................. F24F 13/00
[52] U.S. Cl. ...................................... 237/2 B; 62/427; 98/34.6; 165/4
[58] Field of Search ............... 237/2 B; 62/324.1, 427; 165/54, 4; 98/34.6

[56] References Cited

U.S. PATENT DOCUMENTS 3,831,395  8/1974  Levy ................................. 165/54 X

FOREIGN PATENT DOCUMENTS 3027447  2/1982  Fed. Rep. of Germany ........ 165/54
2288960  5/1976  France ................................... 165/54
58-37431  3/1983  Japan ..................................... 165/54

*Primary Examiner*—Wiliam E. Wayner
*Attorney, Agent, or Firm*—Rolf E. Schneider

[57] ABSTRACT

An air conditioner comprises an air-to-air heat exchanger; a fresh air supply duct, a fresh air by-pass duct, a used air exhaust duct, and a used air by-pass duct, the fresh air supply duct and the used air exhaust duct being respectively connected to the air-to-air heat exchanger, the fresh air supply duct having a part in common with the used air by-pass duct, and the used air exhaust duct having a part in common with the fresh air by-pass duct. Included are a condenser provided in the common part of the fresh air supply duct, and an evaporator provided in the common part of the used air exhaust duct, the condenser and the evaporator being parts of a heat pump. A blower is provided in the common part of the fresh air supply duct and is connected to the used air by-pass duct, and a separate blower is provided in the common part of the used air exhaust duct and is connected to the fresh air by-pass duct. A first three-way valve is arranged in the used air exhaust duct in front of the air-to-air heat exchanger, and a second three-way valve is arranged in the fresh air supply duct behind the air-to-air heat exchanger viewed in the direction of fresh air supply for switching the air conditioner into first, second and third modes wherein the air conditioner functions as a heat pump, a heat pump and a fresh air supplier, and a fresh air supplier, respectively.

3 Claims, 4 Drawing Figures

AIR-CONDITIONER

This invention relates to an air conditioner, comprising a fresh air supply duct and a fresh air by-pass duct and a used air exhaust duct and a used air by-pass duct, said supply and exhaust ducts being connected to an air to air heat exchanger and having first and second common parts respectively with said used air by-pass duct and said fresh air by-pass duct, said first common part of the fresh air supply duct and the used air by-pass duct being provided with a condenser and said second common part of the used air exhaust duct and the fresh-air by-pass duct being provided with an evaporator, said condenser and evaporator being parts of a heat pump and each of said fresh air supply and used air exhaust ducts being provided with a blower connected to the used air by-pass duct and the fresh air by-pass duct respectively and being arranged in said first and second common parts, said supply and exhaust ducts being provided with adjustable valves on both sides of the air to air heat exchanger for switching the air conditioner into first, second and third modes wherein the air conditioner functions as a heat pump, a heat pump and a fresh air supplier, and a fresh air supplier respectively.

Such an arrangement is known from published German Patent Application OS No. 30 47 890. In this case, provision is made of a fresh air supply duct, which extends through an air to air heat exchanger from the outside to a living room. A first blower produces the flow in the fresh air supply duct. A used air exhaust duct extends from the living room through the heat exchanger to the outside and a second blower provided therein draws off used air from the living room. In the used air exhaust duct an evaporator is arranged in front of the outlet, whilst in the fresh air supply ducts a condenser is arranged in front of the inlet to the living room. The evaporator and the condenser form part of a heat pump. By the use of five adjustable valves by-passes (by-pass ducts) can be obtained on either side of the air to air heat exchanger between the fresh air supply duct and the used air exhaust duct. Thus, the air conditioner can be operated in different operating modes. In one mode a heat exchange takes place through the air to air heat exchanger when fresh air is drawn in and used air is exhausted. When the by-passes are opened and the air to air heat exchanger is inoperative a pure heat pump mode of operation is obtained in that the fresh air is passed only through the evaporator, whilst the used air from the living room is passed only through the condenser. In this heat pump mode of operation heat is extracted from the fresh air and the extracted heat is transferred to the living room though the condenser. When the by-pass ducts are opened and the fresh air supply duct and the used air exhaust duct are also opened, a mixed mode of operation is obtained involving simultaneous ventilation and heating.

In this known arrangement, the control of the relatively great number of valves results in a complicated and uneconomical construction.

The present invention has for its object to provide an air conditioner of the indicated type in which the number of valves is decreased so that the control of the various air flows is considerably simplified.

According to the invention, this is achieved in that a first three-way valve is arranged in front of the heat exchanger whilst a second three-way valve is arranged behind the heat exchanger viewed in the direction of fresh air supply.

According to a preferred embodiment of the invention said air to air heat exchanger is constituted by a heat pipe device of which the evaporator section forms a part of the used air exhaust duct whilst the condenser section forms a part of the fresh air supply duct, said evaporator section and said condenser section being separated by a partition wall through which a number of heat pipes extend. Such a heat pipe exchanger offers a small construction without moving parts.

According to a further preferred embodiment of the invention said heat pipes extend in an oblique position with respect to the direction of the force of gravity. The heat pipes contain an evaporable liquid which evaporates due to the flow of warm used air and condenses again due to the flow of cold fresh air. When several separate rows of pipes are utilized the heat transport is confined within a relatively small space so that an optimum counterflow heat exchanger having a correspondingly high degree of heat recovery is obtained.

In order that the invention may be readily carried out, it will now be described with reference to the accompanying drawings, in which.

Figure 1:
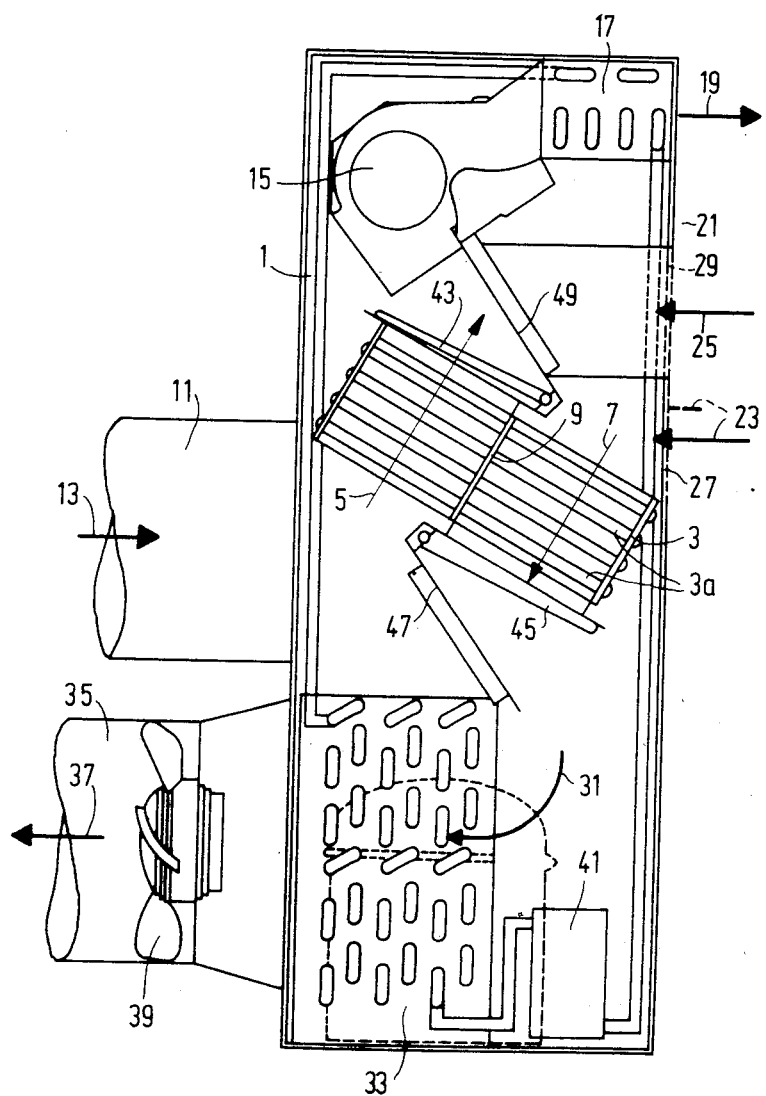
FIG. 1 is a side elevation of the air conditioner.

The air conditioner comprises an air to air heat exchanger 3 which is centrally arranged in an upright housing 1. This heat exchanger 3 is provided with a considerble number of heat pipes 3a which are arranged as a group in an oblique position and are filled with an evaporable working fluid. The hot ends of the heat pipes 3a are located on the lower side and the cold ends are located on the upper side. Fresh air can flow upwards in the directin of arrow 5 and used room air can flow downwards in the direction of arrow 7 though heat exchanger 3. The fresh air supply duct and the used air exhaust duct are separated by means of a partition (separation) wall 9. A flange 11 for a fresh air supply pipe is provided externally on the housing 1. The fresh air flows in the direction of arrow 13 into flange 11, then flows in the direction of the arrow 5 to a blower 15 and leaves the air conditioner after flowing through a condenser 17 in the direction of arrow 19 to the living room 21. This path is designated the fresh air supply duct.

Used room air can enter the housing 1 in the direction of two arrows 23 and 25 through entrances and 29 respectively. Used room air admitted in the direction of the arrow 23 flows in the direction of arrow 7 downwards through heat exchanger 3 and in the direction of arrow 31 through an evaporator 33 and through an outlet flange 35 in the direction of arrow 37 to the outside (ambient). The series of channels, through which the used room air flows in the direction of the arrows 23, 7, 31 and 37, is designated as the used air exhaust duct. Whilst the blower 15 in the fresh air supply duct serves to force fresh air into the living room 21, a blower 39 draws off the used room air to the outside.

The heat pump comprises the compressor 41, the condenser 17 and the evaporator 33.

A three-way valve 43 in the fresh air supply duct and a three-way valve 45 in the used air exhaust duct serve to control the air flows in the air conditioner. When, as shown in FIG. 1, the valve 43 engages the heat exchanger 3, it closes the fresh air supply duct. When the valve 45 engages the heat exchanger 3, this valve 45 closes the used air exhaust duct. The positions of the valves 43 and 45 shown in FIG. 1 represent one end position of the valves 43, 45. Further, by-passes 47 and 49 are provided between the fresh air supply duct and the used air exhaust duct. These by-passes 47 and 49 can be closed by means of the valves 45 and 43. When the valves 45 and 43 close the by-passes 47 and 49, the valves have occupied their second end position.

When the valve 43 is in the position shown in FIG. 1, the by-pass 49 is opened and the used room air flows in the direction of the arrow 25 through an aperture 51 (FIG. 2) directly via the blower 15 in the direction of the arrow 19 and, after passing through the condenser 17 and after taking up heat, is passed therefrom again into the living room.

Figure 2:
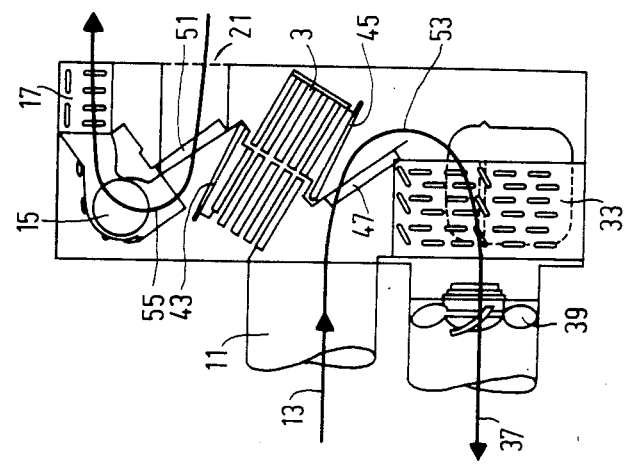
FIGS. 2, 3 and 4 show the air conditioner in different modes of operation.

The separate operating conditions will now be explained more fully with reference to FIGS. 2 to 4. FIG. 2 corresponds to the air conditioner as shown in FIG. 1. In this mode, a pure heat pump operation is effected by means of the valves. The valves 43 and 45 close the passages through the heat exchanger 3. This means that the blower 39 conducts the fresh air drawn in the direction of the arrow 13 in the direction of arrow 53 through by-pass 47 directly to the evaporator 33 and through outlet flange 35 to the outside. Consequently, only heat is extracted from this incoming fresh air. Since the valve 43 also closes the heat exchanger 3, the used room air drawn in via the aperture 51 flows through the blower 15 and the condenser 17 in the direction of arrow 55 back into the living room. Thus, in this case a pure heat pump (heating) mode is provided, in which heat is extracted from the fresh air and this extracted heat is utilized to heat the living room 21 by means of the heat pump.

Figure 3:
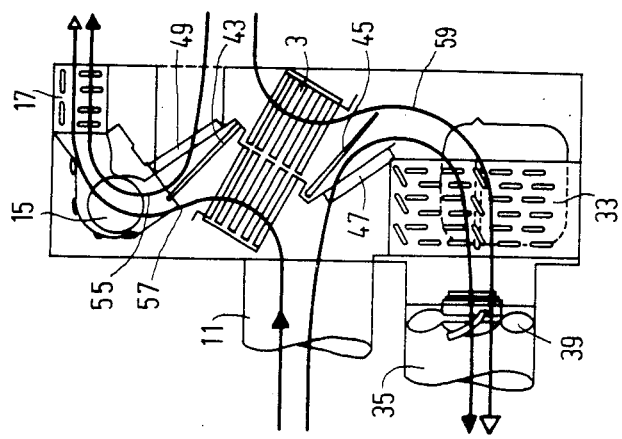

In FIG. 3, the valves 43 and 45 occupy intermediate positions. In these intermediate positions, the by-passes 47 and 49 are partly opened, as is the heat exchanger 3. This means that in addition to the flows in the direction of the arrows 53 and 55 according to FIG. 2 for the pure heating mode, flows 57 and 59 for a ventilation mode are effected. Consequently, the fresh air supply duct and the used air exhaust duct as well as the bypasses are partly opened. The condenser forms a first common part of the fresh air supply duct and the used air by-pass whilst the evaporator forms a second common part of the used air exhaust duct and the fresh air by-pass.

Figure 4:
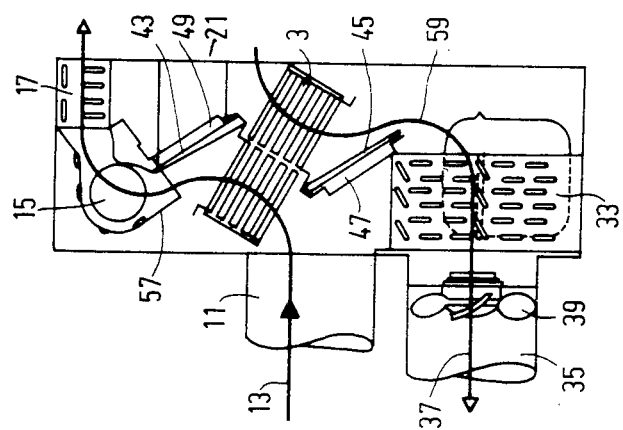

FIG. 4 shows the valves 45 and 43 in a position in which they close entirely the by-passes 47 and 49. In this case, the air transported by means of the blowers 15 and 39 can flow from the outside to the inside and from the inside to the outside only in the direction of the arrows 57 and 59 respectively. In the heat exchanger 3, the heat is extracted from the used room air drawn off in the direction of the arrow 59. This heat is transferred to the flow 57 of fresh air and is thus supplied again to the room 21.

For the three operating positions, therefore only two valves are required, which are adjusted by means of usual control devices. The control of these valves may be effected in a very simple manner.

We claim:

1. An air conditioner comprising an air-to-air heat exchanger; a fresh air supply duct, a fresh air by-pass duct, a used air exhaust duct, and a used air by-pass duct, said fresh air supply duct and said used air exhaust duct being respectively connected to said air-to-air heat exchanger, said fresh air supply duct having a part in common with said used air by-pass duct, and said used air exhaust duct having a part in common with said fresh air by-pass duct; a condenser provided in said common part of the fresh air supply duct, and an evaporator provided in said common part of the used air exhaust duct, said condenser and said evaporator being parts of a heat pump; a blower provided in the common part of said fresh air supply duct and connected to the used air by-pass duct, and a separate blower provided in the common part of said used air exhaust duct and connected to the fresh air by-pass duct; a first three-way valve arranged in the used air exhaust duct in front of the air-to-air heat exchanger, and a second three-way valve arranged in the fresh air supply duct behind the air-to-air heat exchanger view in the direction of fresh air supply for switching the air conditioner into first, second and third modes wherein the air conditioner functions as a heat pump, a heat pump and a fresh air supplier, and a fresh air supplier, respectively.

2. An air conditioner according to claim 1, in which said air-to-air heat exchanger comprises a heat pipe device having its evaporator section forming a part of the used air exhaust duct and its condenser section forming a part of the fresh air supply duct, said evaporator section and said condenser section being separated by a partition having a number of heat pipes extending therethrough.

3. An air conditioner according to claim 2, in which said heat pipes extend in an oblique position with respect to the direction of the force of gravity.

* * * * *